(12) United States Patent
Tabarovsky et al.

(10) Patent No.: US 7,299,131 B2
(45) Date of Patent: Nov. 20, 2007

(54) INDUCTION RESISTIVITY IMAGING PRINCIPLES AND DEVICES IN OIL BASED MUD

(75) Inventors: Leonty A. Tabarovsky, Cypress, TX (US); Alexandre Bespalov, Spring, TX (US); Mikhail Epov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 25 days.

(21) Appl. No.: 11/300,527

(22) Filed: Dec. 14, 2005

(65) Prior Publication Data

US 2006/0155471 A1 Jul. 13, 2006

Related U.S. Application Data

(60) Provisional application No. 60/637,060, filed on Dec. 17, 2004.

(51) Int. Cl.
*G01V 1/38* (2006.01)
(52) U.S. Cl. .......................................................... 702/7
(58) Field of Classification Search .................... 702/7
See application file for complete search history.

(56) References Cited

U.S. PATENT DOCUMENTS

| | | | |
|---|---|---|---|
| 2,930,969 A | 3/1960 | Baker | 324/10 |
| 3,365,658 A | 1/1968 | Birdwill | 324/10 |
| 4,122,387 A | 10/1978 | Ajam et al. | 324/10 |
| 4,468,623 A | 8/1984 | Gianzero et al. | 324/367 |
| 5,041,975 A | 8/1991 | Minerbo et al. | 364/422 |
| 5,502,686 A | 3/1996 | Dory et al. | 367/34 |
| 5,737,277 A | 4/1998 | Priest | 367/27 |
| 6,344,746 B1 | 2/2002 | Chunduru et al. | 324/339 |
| 6,560,889 B1 | 5/2003 | Lechen | 33/544.3 |
| 6,600,321 B2 | 7/2003 | Evans | 324/369 |
| 6,717,014 B1 | 4/2004 | Schwindeman et al. | 564/310 |
| 6,801,039 B2 | 10/2004 | Fabris et al. | 324/324 |
| 2002/0117299 A1 | 8/2002 | Haugland et al. | 166/254.2 |

FOREIGN PATENT DOCUMENTS

CA  685727  5/1964

OTHER PUBLICATIONS

M. A. Frenkel et al.; *Enhanced Interpretation of Russian and Oil Electrical Resistivity Logs Using Modeling and Inversion Methods*, SPE 38688, XP-002377985, 1997 SPE Annual Technical Conference and Exhibition, Oct. 5-8, 1997, pp. 10, 8 Figs.

*Primary Examiner*—Donald E McElheny, Jr.
(74) *Attorney, Agent, or Firm*—Madan, Mossman & Sriram, P.C.

(57) ABSTRACT

An induction logging tool having transmitter and receiver antennas is used to make measurements of earth formations. The antennas may be mounted on the mandrel of a bottom-hole assembly for MWD applications, or may be pad mounted for wireline applications. The induction measurements are inverted using a linearized model. The model parameters are determined in part from caliper measurements.

20 Claims, 14 Drawing Sheets

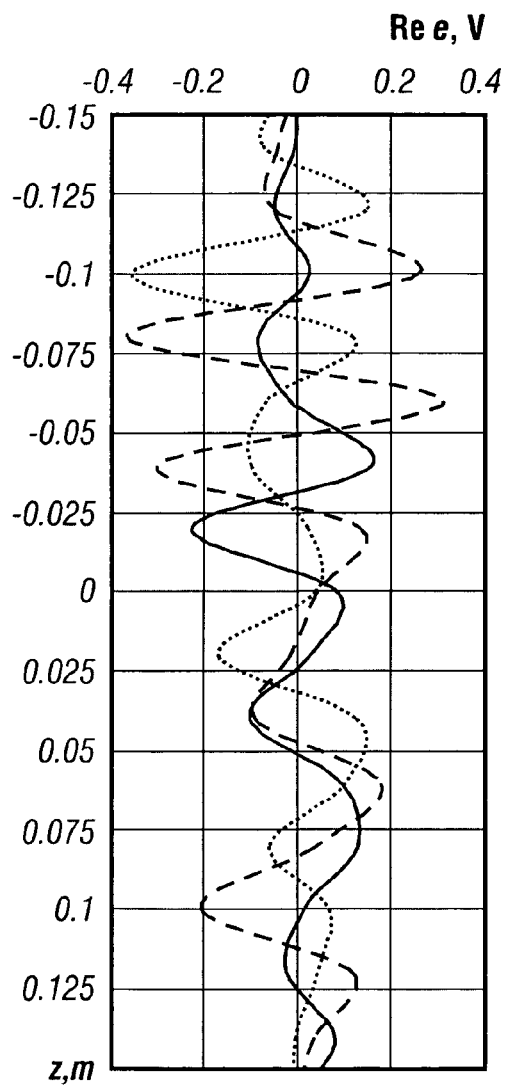
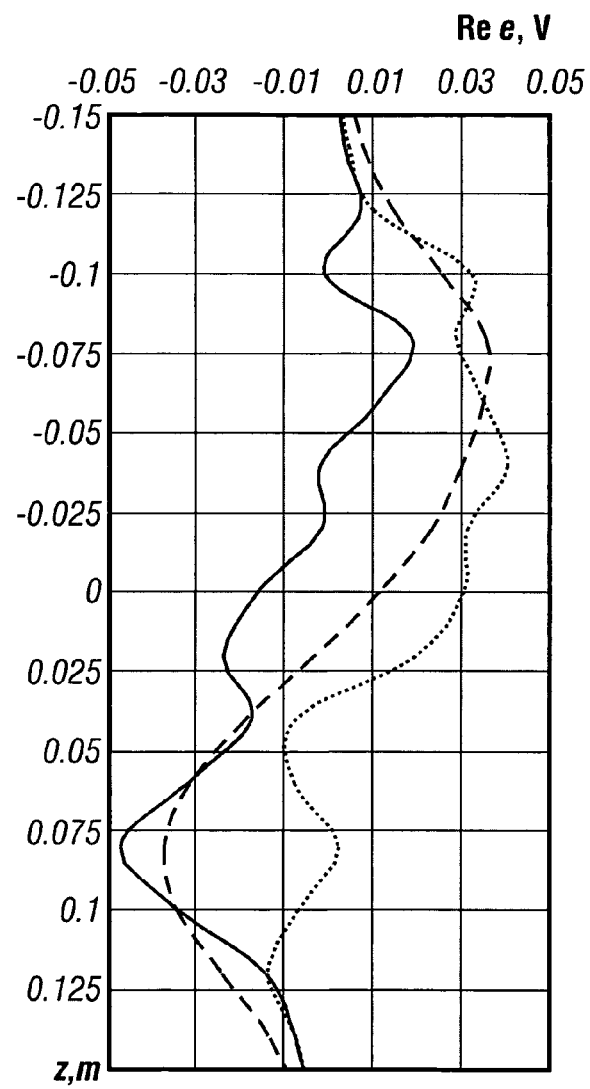
FIG. 13a
FIG. 13b

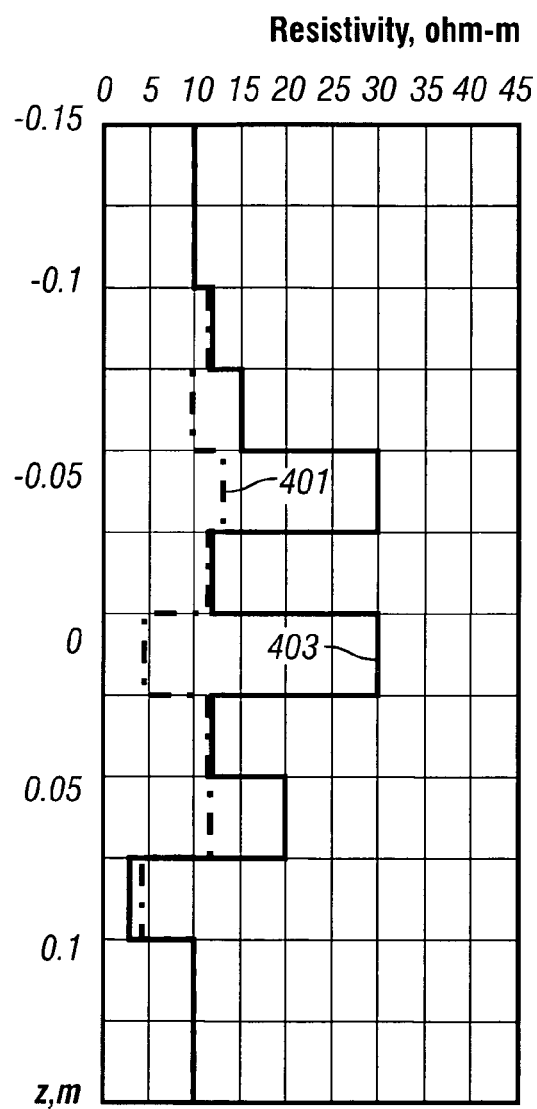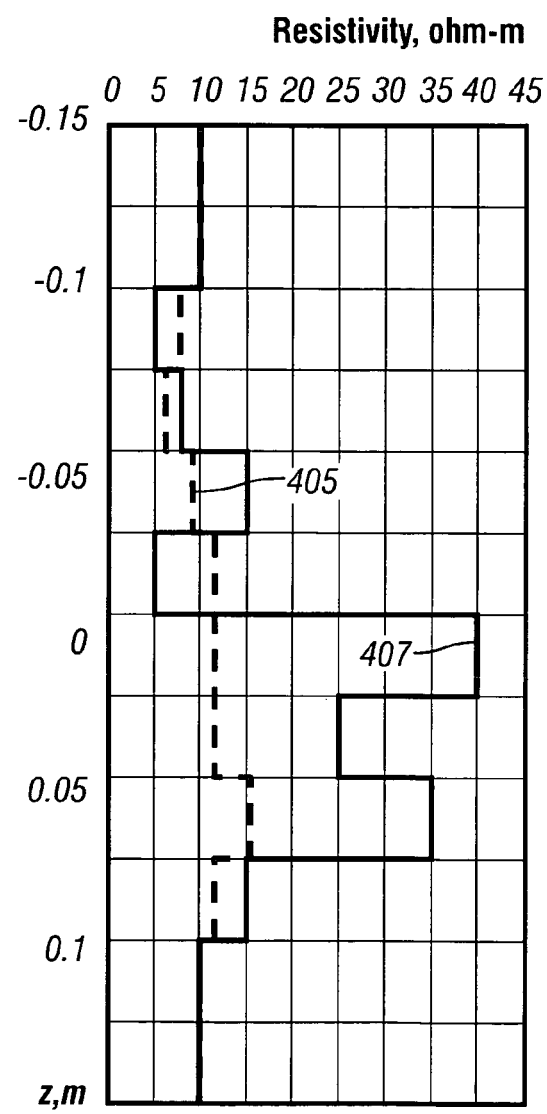
*FIG. 14a*  *FIG. 14b*

INDUCTION RESISTIVITY IMAGING PRINCIPLES AND DEVICES IN OIL BASED MUD

CROSS-REFERENCES TO RELATED APPLICATIONS

This application claims priority from U.S. Provisional Patent Application Ser. No. 60/637,060 filed on Dec. 17, 2004.

BACKGROUND OF THE INVENTION

1. Field of the Invention

The present invention relates to well logging. In particular, the present invention is an apparatus and method for imaging of subsurface formations using electrical methods.

2. Background of the Art

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems.

Techniques for investigating the earth formation with arrays of measuring electrodes have been proposed. See, for example, the U.S. Pat. No. 2,930,969 to Baker, Canadian Pat. No. 685,727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

U.S. Pat. No. 6,714,014 to Evans et al., the contents of which are fully incorporated herein by reference, discloses a device suitable for resistivity imaging with water based mud (WBM) and oil based mud (OBM). The device disclosed in the Evans '014 patent is basically a wireline logging device. U.S. Pat. No. 6,600,321 to Evans discloses a modification of the Evans '374 application that is adapted for use in measurement while drilling (MWD) applications. Both of the Evans' patents have pad mounted electrodes that are in contact with the earth formation.

The devices described above are galvanic devices in which current is injected into the formation. With the exception of the Evans patents, they only work when the borehole is filled with a conducting fluid. U.S. patent application Ser. No. 10/657,870 of Ritter et al., filed on Sep. 9, 2003 and the contents of which are fully incorporated herein by reference, teaches the use of galvanic, induction and propagation resistivity devices for borehole imaging in MWD applications. The resistivity sensor may be mounted on a pad, rib, or a stabilizer. Specifically disclosed therein are a shielded dipole antenna and a quadrupole antenna. In addition, the use of ground penetrating radar with an operating frequency of 500 MHz to 1 GHz is disclosed. One embodiment of the Ritter device involves an arrangement for maintaining the antenna at a specified offset from the borehole wall using, for example, hard facing.

The prior art identified above does not address the issue of borehole rugosity and its effect on induction measurements. Being primarily high resolution imaging applications, the problem of "seeing" into the earth formation is generally not addressed. In addition, usually the effect of mud resistivity on the measurements is not addressed. It would be desirable to have a method and apparatus that estimates resistivities of earth formations away from the borehole. Such a method should take into account irregularities in the borehole wall, as well as the effect of mud resistivity. The present invention satisfies this need.

SUMMARY OF THE INVENTION

One embodiment of the present invention is a method of and apparatus for determining a conductivity of an earth formation. First measurements of the conductivity are made using at least one transmitter antenna and at least one receiver antenna substantially concentric with the transmitter antenna. The at least one transmitter antenna and the at least one receiver antenna are disposed on a tool in a borehole in the earth formation. Additional measurements indicative of distances from the tool to a wall of the borehole are obtained. The first measurements are inverted using a model defined at least in part by the second measurements. In one embodiment of the invention, the first measurements are induction measurements. The second measurements may be caliper measurements obtained using an acoustic caliper or a mechanical caliper.

The model includes a resistivity of mud in the borehole. The mud resistivity used in the inversion may be based on actual downhole measurements or they may be temperature corrected values of surface measurements. In one embodiment of the invention, the spatial geometry of the model is not updated during the inversion. The e.m.f. difference between initial and background models δe can be approximately described in the form of a linear system of algebraic equations. Using the linearized model, perturbations are calculated and added to the background model to give an updated background model. This is done iteratively until convergence is obtained.

BRIEF DESCRIPTION OF THE FIGURES

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention, and wherein:

FIGS. 13a and 13b show responses of the antennas of FIG. 6 to the model of FIG. 11;

FIGS. 14a and 14b show results after one and four iterations of using the method of the present invention on the responses shown in FIGS. 13a and 13b.

DETAILED DESCRIPTION OF THE INVENTION

Before discussing specific methods and hardware for induction resistivity imaging in oil based mud, the principles on which such methods and hardware should be based are discussed. The analysis herein includes the effect of borehole rugosity, something that has hitherto been not addressed.

Figure 1:
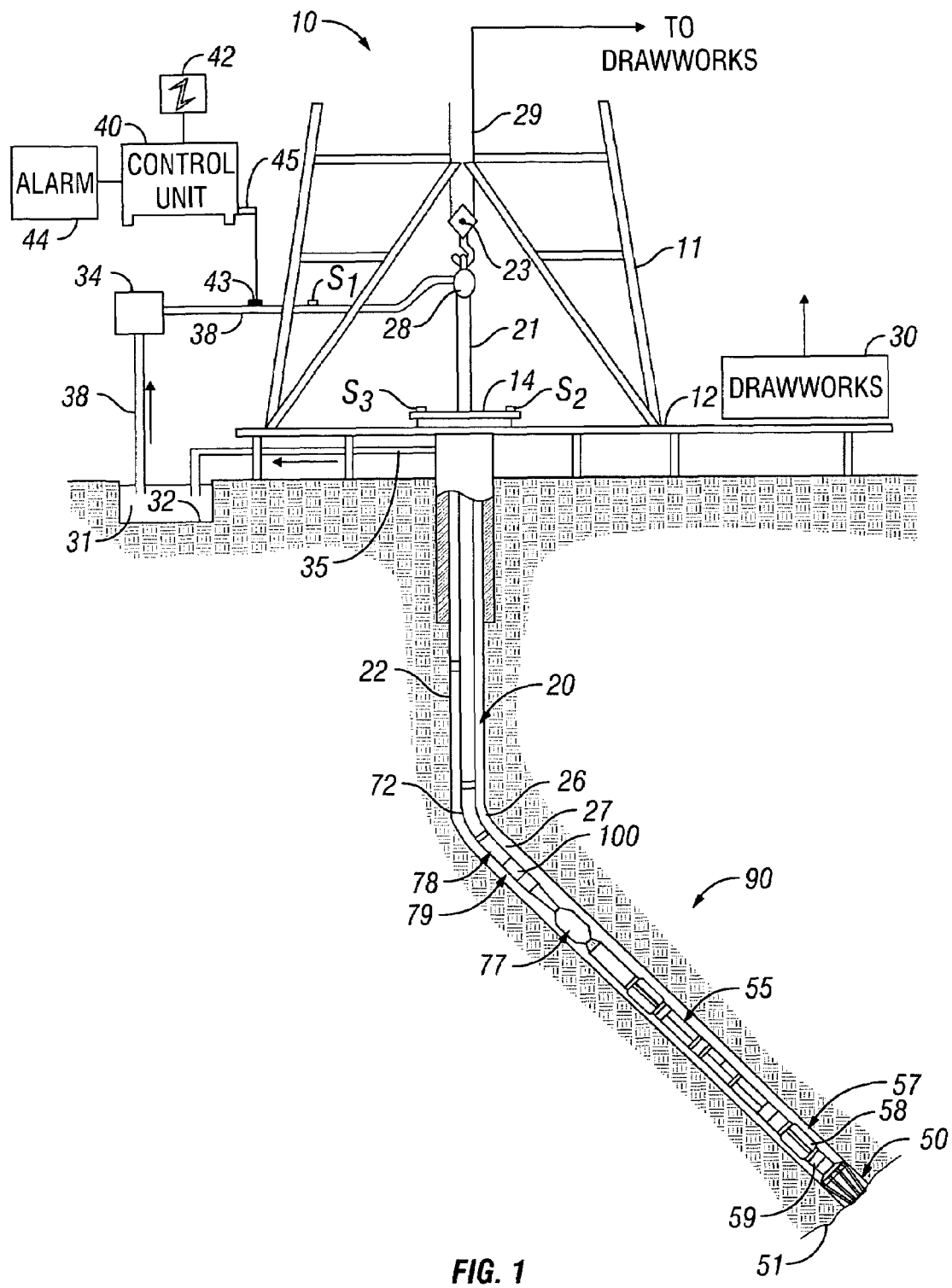
FIG. 1 (prior art) is a schematic illustration of a drilling system.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), into the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger, fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
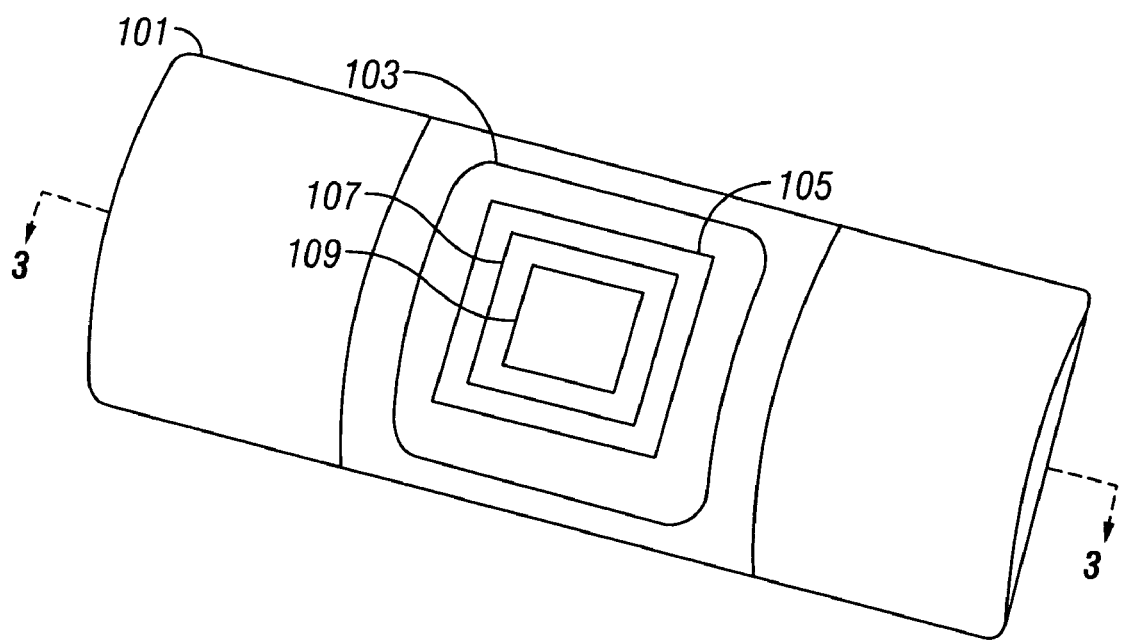
FIG. 2 illustrates one embodiment of the present invention on a drill collar.

Turning now to FIG. 2, one configuration of a resistivity sensor for MWD applications is shown. Shown is a section of a drill collar 101 with a recessed portion 103. The drill collar forms part of the bottomhole assembly (BHA) discussed above for drilling a wellbore. For the purposes of this document, the BHA may also be referred to a downhole assembly. Within the recessed portion, there is a transmitter antenna 109 and two receiver antennas 105, 107 (the far receiver or receiver R2, and the near receiver or receiver R1) that are substantially concentric with the transmitter antenna. It is to be noted that the term "concentric" has two dictionary definitions. One is "having a common center", and the other is "having a common axis." The term concentric as used herein is intended to cover both meanings of the term. As can be seen, the axis of the transmitter antenna and the receiver antenna is substantially orthogonal to the longitudinal axis of the tool (and the borehole in which it is conveyed). Based on simulation results (not shown) it has been found that having the transmitter antenna with an axis parallel to the borehole (and tool) axis does not give adequate resolution.

Operation of an induction logging tool such as that disclosed in FIG. 2 is discussed next in the context of an exemplary borehole filled with oil-base mud. Borehole walls are irregular. Resistivities behind the borehole walls need be determined as a function of both the azimuthal angle and depth. An array for determination of resistivities should be mounted above a sidewall pad. The generic schematic representation of a medium and a pad is shown in FIG. 3.

Figure 3:
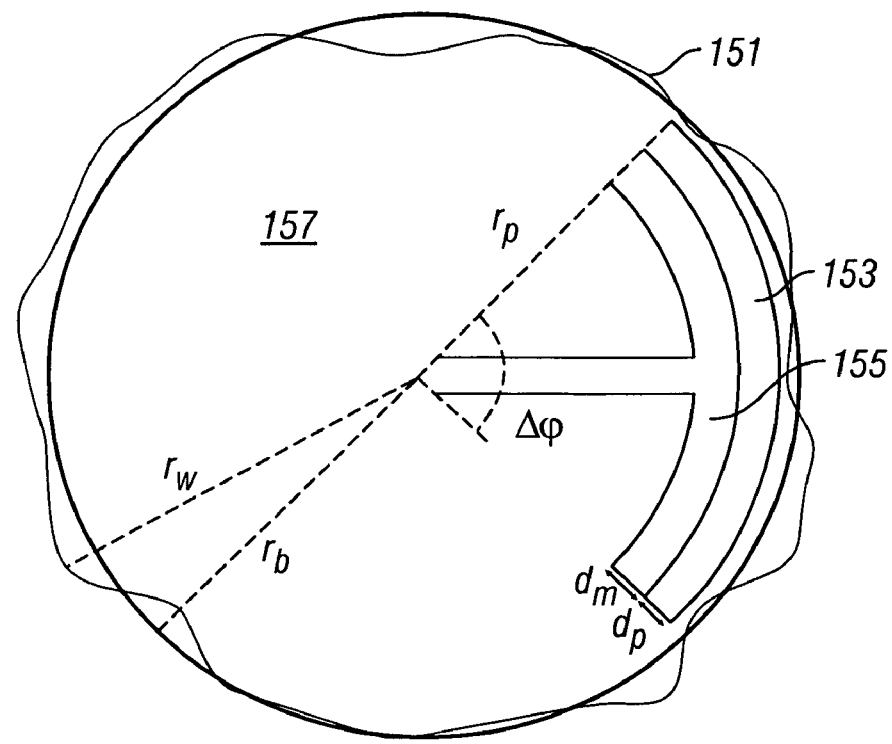
FIG. 3 is a cross-sectional view of a logging tool including a transmitter and a receiver in a borehole.

Shown in FIG. 3 is a borehole 157 having mud therein and a wall 151. As can be seen, the wall is irregular due to rugosity. A metal portion of an antenna on a resistivity measuring tool is denoted by 155 and an insulating portion by 153.

A polar coordinate system $\{r, \phi, z\}$ is indicated in FIG. 3. The vertical z axis is in line with the borehole axis and it is directed downward (i.e., into the paper). The borehole radius is considered to be a function of both the azimuthal angle and depth $$r_w = f(\phi, z) \tag{1}$$

The nominal borehole radius is designated as $r_d$. Further it is assumed that mean deviations of real value of distance to the borehole wall from a nominal radius within the depth range ($z_1$, $z_2$) are relatively insignificant $$\delta_r = \frac{\int_{z_1}^{z_2} \int_0^{2\pi} |r_w - r_d| r\, dr\, d\varphi}{\pi r_d^2} \leq 0.1. \tag{2}$$

The surface of the insulating area of a sidewall pad is described by equation $$r_p = f(\phi_1, \phi_2, z_1, z_2, \phi, z) = c_1, z_1 \leq z \leq z_2. \tag{3}$$

The surface of the metallic part of a pad is described by equation $$r_m = f(\phi_1, \phi_2, z_1, z_2, \phi, z) = c_2, z_1 \leq z \leq z_2. \tag{4}$$

Here $\Delta\phi = (\phi_2 - \phi_1)$ and ($z_2 - z_1$) are both angular and vertical sizes of a pad, $d_p = r_p r_m$ is the insulator thickness, $d_m$ is the metal thickness.

Figure 4:
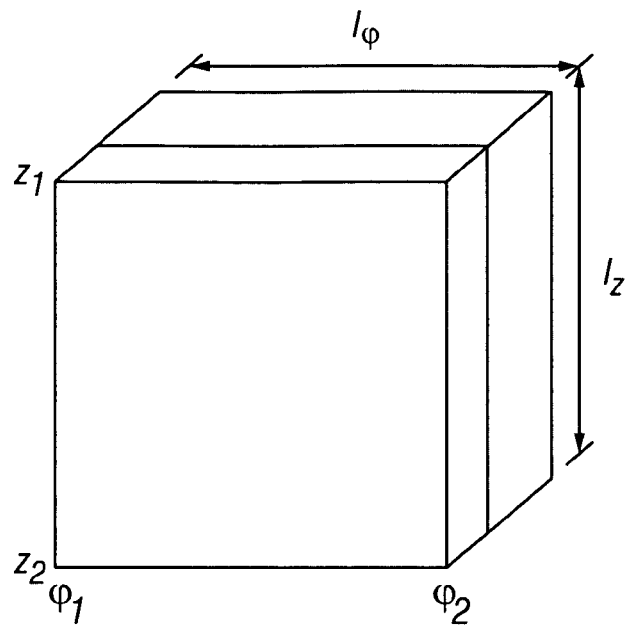
FIG. 4 shows the plane layer approximation used in one embodiment of the invention.

Contact of the pad with the borehole wall implies that in the domain [$\phi_1$, $\phi_2$, $z_1$, $z_2$] there exist points at which $r_p = r_w$. For the remaining points, the following inequality is obeyed $r_p < r_w$. As an example, the angular size of a sidewall pad is taken to be 45°. Referring to FIG. 4, the pad dimensions are $l_\phi$ and $l_z$ at the nominal borehole diameter $r_b$. For the examples given below, $r_b$ is 0.108 m and $l_\phi$ and $l_z$ are taken to be 0.085 m.

In the model, the oil-base mud resistivity is equal to $10^3$ Ω-m, the resisitivity of the insulating area on the pad surface is $10^3$ Ω-m, and the metallic case resistivity of a pad is in the order of $10^{-6}$ Ω-m. The rock resistivity varies in the range 0.1-200 Ω-m. We consider the radial thickness of the insulating pad area is equal to $d_p = 0.02$ m, the radial thickness of the metallic pad area is equal to $d_m = 0.03$ m.

To simplify the analysis, instead of the model with concentric boundaries shown in FIG. 3, we take the planar-layered model of FIG. 4. The relative deviation of the pad surface from the plane $$\Delta r_p / r_p \approx 1 - \cos\frac{\pi}{8} = 0.076.$$

The linear pad size in the plane $z = \tilde{z}(z_1 \leq \tilde{z} \leq z_2)$ is equal to $$\tilde{l}_\varphi = 2r_p \sin\frac{\pi}{8} = 0.083$$

The relative change in linear size $$\delta l = \frac{l_\varphi - \bar{l}_\varphi}{l_\varphi}$$

is less than 2.5%.

The skin depth in the metallic pad area $$\delta \approx \frac{0.005}{\sqrt{f}}$$

(f is the frequency in MHz). At the frequency f=1 MHz, the skin depth is 5 mm. It is essentially less than the radial depth $d_m$. Hence, the results of calculations may be considered as slightly affected by this value.

The three-layer model in the plane approximation is characterized by Cartesian coordinates $\{x, y, z\}$. The x axis is perpendicular to the pad surface and it is directed to the right in FIG. 5. Then the pad surface is described by equation x=0. This surface divides highly conductive half-space (the metallic pad part) and non-conducting area. The latter includes the non-conducting pad part and mud layer. The layer thickness is variable due to the borehole wall irregularity. The "Mud-medium" boundary equation can be written in the following form $$x_w = f(y, z). \quad (5)$$

Figure 5:
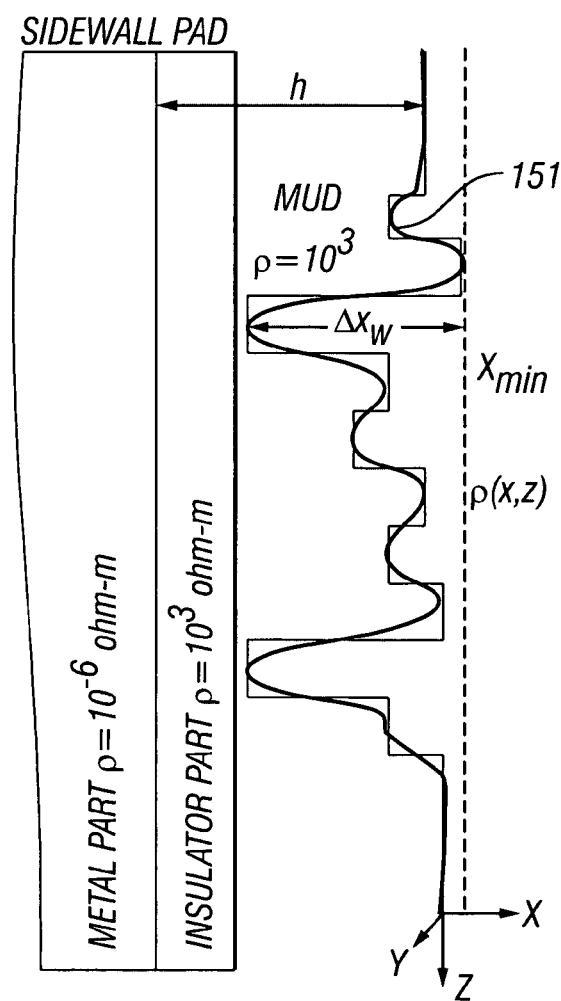
FIG. 5 shows a sectional view of variations in borehole size.

At that $x_w \geq 0$. An amplitude of boundary relief can be determined as follows:

$$\Delta x_w = x_w - x_{min}, \quad (6)$$

where $x_{min} = \min\{x_w\}$ for all (y, z). The amplitude of an irregular boundary $\Delta x_w$ is 0.01 m on average. Beyond this boundary, an inhomogeneous conducting medium is located. The complete model is shown in FIG. 5 where 151 is the borehole wall. The three layers of the model comprise (i) the metal, (ii) the insulator and borehole fluid, and (iii) the formation outside the borehole wall.

As a source of a field, current loops are chosen that are located in parallel with the wall contact equipment surface and are coated with insulator with thickness less than 0.01 m. Receiving loops are also mounted here. For the purposes of the present invention, the terms "loop" and "coil" may be used interchangeably. Two arrays are placed above a sidewall pad. The first array consists of two coaxial current loops of relatively large size (radius is $0.5l_\varphi$). The loops are spaced apart from each other at a distance of 0.01 m the direction perpendicular to the pad surface. The small loop that is coaxial with the transmitter loops is located in the midst. The ratio between loop currents is matched so that a signal is less than the noise level in the absence of a medium under investigation. The frequency of supply current is chosen so that a skin depth would be larger of characteristic sizes of inhomogeneities.

Figure 6:
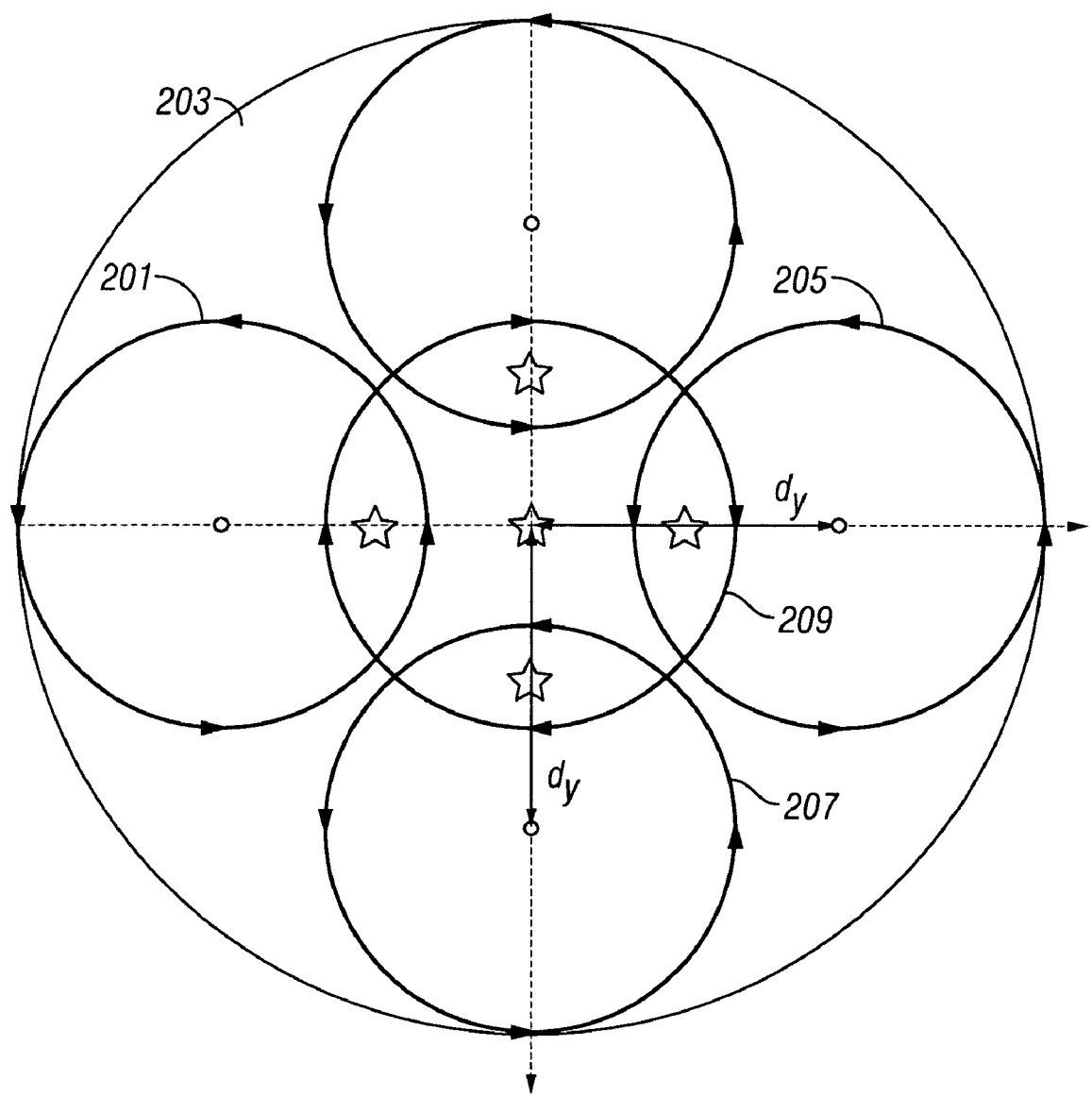
FIG. 6 illustrates an arrangement of loop antennas.

To investigate medium structure, an array comprising a set of current loops has been simulated. The placing of loops 201, 203, 205, 207, 209 as well as directions of currents are shown in FIG. 6. Measurements points and the current direction are chosen in such a way to suppress the direct loop field. The measurements points are denoted by the star symbols in FIG. 6. Distances between centers of current loops are designated as d. If the loop centers are spaced along the z axis, $d=d_z$, and if the loop centers are spaced along the y axis, $d=d_y$. A measurement point is always located at the same distance from loop centers. Actually current and receiving loops would be situated in different planes. However, to simplify calculations, these loops are located in the same plane.

A mathematical statement of the forward modeling program follows. A horizontal current turn of radius $r_0$ with the center at the point $(x_0, y_0, z_0)$ is represented by an exterior inductive source. Hereinafter $x_0=0$. A monochromatic current flows in the turn, the current density being $$\vec{j}^{cm} = I_0 \delta(x-x_0)\delta(y-y_0)\delta(z-z_0)e^{-i\omega t}, \quad (7)$$

here $\omega=2\pi f$ is the angular frequency, $\delta$ is the Dirac delta function, and $I_0$ is the current amplitude.

The electric field $\vec{E}(x, y, z)$. Maxwell equations in a conductive nonmagnetic medium ($\mu=\mu_0=4\pi \cdot 10^{-7}$ H/m) has the form $$\begin{cases} \nabla \times \vec{H} = \tilde{\sigma}\vec{E} + \vec{j}^{cm} \\ \nabla \times \vec{E} = i\omega\mu_0 \vec{H} \end{cases} \quad (8)$$

where $\vec{j}^{cm} = \{j_x^{cm}, j_y^{cm}, j_z^{cm}\}$ and $\tilde{\sigma}=(\sigma-i\omega\epsilon)$ is the complex conductiy, $\sigma$ is the conductivity, $\epsilon$ is the permittivity. From the system of equations (8), Helmholtz's equation for an electric field $\vec{E}$ in the domain containing a source gives $$\nabla \times \nabla \times \vec{E} + k^2(\xi)\vec{E} = -i\omega\mu_0 \vec{j}^{cm} \quad (9)$$

here $\xi$ (x, y, z) is the observation point, $k=\sqrt{-\omega\mu_0\tilde{\sigma}}$ is the wave number.

At all boundaries, tangential electric field components are continuous $$[E_\tau]_{x=x_j} = 0, \quad (10)$$

the condition of descent at infinity is met $$|E_{x,y,z}| \xrightarrow[\xi \to \infty]{} 0 \quad (11)$$

Equation (9) in conjunction with conditions (10)-(11) defines the boundary problem for the electric field.

An approximate solution of a boundary problem is derived next by a perturbation technique. It is assumed that the three-dimensional conductivity distribution can be represented as a sum $$\sigma(\xi) = \sigma^b(z) + \delta\sigma(\xi), \quad (12)$$

where $\sigma^b(z)$ is the one-dimensional conductivity distribution that depends only on the z coordinate, $\delta\sigma(\xi)$ are its relatively minor three-dimensional distributions. The values of perturbations are determined by the following inequality:

$$\frac{\max|\delta\sigma(\xi)|}{\sigma^b(z)} < 0.2.$$

The model with one-dimensional conductivity distribution $\sigma^b(z)$ will be hereinafter termed as background model and corresponding field as normal fields. Starting from eqn. (12), an electric field can be described as a sum of background and perturbed components $$\vec{E} = \vec{E}^b + \delta\vec{E}, \tag{13}$$

where $\vec{E}^b$ is the background electric field and $\delta\vec{E}$ is its perturbation. The $\vec{E}^b$ field obeys the following equation $$\nabla \times \nabla \times \vec{E}^b + [k^b(z)]^2 \vec{E}^b = -i\omega\mu_0 \vec{j}^{cm}, \tag{14}$$

here $k^b(z) = \sqrt{-i\omega\mu_0\sigma^b(z)}$ is wave number for the background model. Substituting eqns. (12)-(13) into eqn. (14), we obtain $$\nabla \times \nabla \times (\vec{E}^b + \delta\vec{E}) + ([k^b(z)]^2 + \delta k^2(\xi))(\vec{E}^b + \delta\vec{E}) = -i\omega\mu_0 \vec{j}^{cm}, \tag{15}$$

where $\delta k^2(\xi)$ is perturbation of the wave number square associated with relatively minor spatial variations of conductivity in some domain V.

From (14) and (15), we obtain equation for the perturbed component $\delta\vec{E}$ $$\nabla \times \nabla \times \delta\vec{E} + [k^b(z)]^2 \delta\vec{E} = -\delta k^2(\xi)(\vec{E}^b + \delta\vec{E}) \tag{16}$$

Vector eqn. (16) can be solved using the Green's functions. These functions are solutions of the same equation, but with other right part $$\nabla \times \nabla \times \vec{G}^E + [k^b(z)]^2 \vec{G}^E = \delta(x-x_0)\delta(y-y_0)\delta(z-z_0) \vec{i}_{x,y,z}, \tag{17}$$

here $\vec{i}_x, \vec{i}_y, \vec{i}_z$, are unit vectors of the generic Cartesian coordinates.

Then from eqns, (16) and (17), we obtain $$\delta\vec{E} = -\int_V \delta k^2(\xi) \vec{G}^E (\vec{E}^b + \delta\vec{E}) dV. \tag{18}$$

We now consider a model in which the perturbation is a change of conductivity.

If the source loop and measurement point are situated outside of the conductivity perturbation domain, then the electric field $\vec{E}(\xi_0|\xi)$ is the solution of integral Fredholm's equation $$\vec{E}(\xi_0|\xi) = \vec{E}^b(\xi_0|\xi) - \int_V \delta k^2(\xi') \vec{G}^E(\xi|\xi') \vec{E}(\xi_0|\xi') dV. \tag{19}$$

here $\xi_0(x_0, y_0, z_0)$, $\xi(x, y, z)$ are points defining the position of both a source and receiver and $\xi'(x', y', z')$ is the integration point. From initial equations, both a magnetic field and corresponding Green's vector are determined by the given electric field.

$$\vec{H} = \frac{1}{i\omega\mu_0} \nabla \times \vec{E}, \quad \vec{G}^H = \frac{1}{i\omega\mu_0} \nabla \times \vec{G}^E. \tag{20}$$

As known, the magnetic field $\vec{H}(\xi_0|\xi)$ can be determined from a similar (19) integral equation $$\vec{H}(\xi_0|\xi) = \vec{H}^b(\xi_0|\xi) - \int_V \delta k^2(\xi') \vec{G}^H(\xi|\xi') \vec{H}(\xi_0|\xi') dV. \tag{21}$$

When fields are determined, a linear approximation consists in substitution of full fields in integrands (20) and (21) by fields in a background medium $$\vec{E}(\xi) \approx \vec{E}^b(\xi), \vec{H}(\xi) \approx \vec{H}^b(\xi). \tag{22}$$

Thus the azimuthal electric and the horizontal magnetic field components are described by integrals:

$$E_\varphi(\xi_0|\xi) = E_\varphi^b(\xi_0|\xi) - \int_V \delta k^2(\xi') E_\varphi^b(\xi|\xi') E_\varphi^b(\xi_0|\xi') dV, \tag{23}$$

$$H_x(\xi_0|\xi) = H_x^b(\xi_0|\xi) - \int_V \delta k^2(\xi') H_z^b(\xi|\xi') H_z^b(\xi_0|\xi') dV.$$

Accuracy of a linear approximation depends on a choice of background model, sizes of inhomogeneity, and relatively contrasting electrical conductivity. As a background model, we use three-layer planar-layered model descried above with reference to FIG. 5. We introduce the cylindrical coordinate system $\{r, \phi, x\}$, where $r = \sqrt{y^2 + z^2}$, $$\tan\varphi = \frac{y}{z}.$$

Thus when both the source and receiver are located in a layer, the horizontal magnetic field component is described by the expression:

$$H_x = H_x^0 + Ir_0 \int_0^\infty \lambda^2 J_1(\lambda r_0) J_0(\lambda r) \Phi_2^2 d\lambda. \tag{24}$$

Here $$h = x_2 - x_1,$$

$$\Phi_2^2 = -\frac{1}{2p_2\Delta}[(e^{-p_2(x_2-x)} - k_{12}e^{-p_2h}e^{-p_2(x-x_1)})k_{32}e^{-p_2(x_2-x_0)} + +$$

$$(e^{-p_2(x-x_1)} - k_{32}e^{-p_2h}e^{-p_2(x_2-x)})k_{12}e^{-p_2(x_0-x_1)}],$$

$$I = I_0 e^{-i\omega t}, k_j^2 = -i\omega\mu_0\sigma_j - \omega^2\mu_0\varepsilon_j, \; p_j = \sqrt{k_j^2 + \lambda^2} \; j = 1, \ldots, 3$$

($j = 1$ – metal pad part, $j = 2$ – insulator pad part, $j = 3$ – investigated medium), -continued
$$k_{12} = \frac{p_1 - p_2}{p_1 + p_2}, k_{32} = \frac{p_3 - p_2}{p_3 + p_2}, \Delta = 1 - k_{12}k_{32}e^{-2p_2h}.$$

Here the horizontal magnetic component of the field generated by a current loop of the radius $r_0$ in a homogenous medium with formation parameters is $$H_x^0 = -\frac{Ir_0}{\pi}\int_0^\infty pI_1(pr_0)K_0(pr)\cos(\lambda|x - x_0|)d\lambda, r \geq r_0, \quad (25)$$

$$H_x^0 = \frac{Ir_0}{\pi}\int_0^\infty pI_0(pr)K_1(pr_0)\cos(\lambda|x - x_0|)d\lambda, r \leq r_0.$$

Let us consider an integral over the conductivity perturbation domain from (24) and (25) as a superposition of secondary source fields. We determine an integrand similarly to expression (24) and (25). The integrand is described in the multiplicative form. The anomalous part of the horizontal magnetic field component of a current loop can be represented as a superposition of responses from corresponding horizontal and vertical electric dipoles. In this case, the responses are Green's functions and these define moments of secondary sources $\delta k^2(\xi')E_{xz}$ and $\delta k^2(\xi')E_{xy}$. The cofactors ($E_{xz}$, $E_{xy}$) ca be defined as follows $$E_{xz} = -i\omega\mu_0 Ir_0\sin\chi_1 \int_0^\infty \lambda J_1(\lambda r_0)J_1(\lambda r_1)\Phi_3^2 d\lambda,$$

$$E_{xy} = i\omega\mu_0 Ir_0\cos\chi_1 \int_0^\infty \lambda J_1(\lambda r_0)J_1(\lambda r_1)\Phi_3^2 d\lambda$$

or $$E_{xz} = \sin\chi_1 E_\varphi, E_{xy} = -\cos\chi_1 E_\varphi,$$

$$E_\varphi = -i\omega\mu_0 Ir_0 \int_0^\infty \lambda J_1(\lambda r_0)J_1(\lambda r_1)\Phi_3^2 d\lambda.$$

Where $$\Phi_3^2 = \frac{1}{(p_3 + p_2)\Delta}\left[(e^{-p_2(x_2 - x_0)} - k_{12}e^{-p_2h}e^{-p_2(x_0 - x_1)})e^{-p_3(x' - x_2)}\right],$$

$$r_1 = \sqrt{(z_0 - z')^2 + (y_0 - y')^2}.$$

Correspondingly, vertical magnetic field components ($H_{zx}$, $H_{xy}$) from secondary sources are represented in the form $$H_{zx} = \sin\chi_2 \int_0^\infty \lambda^2 J_1(\lambda r_2)\Phi_2^3 d\lambda$$

$$H_{xy} = -\cos\chi_2 \int_0^\infty \lambda^2 J_1(\lambda r_2)\Phi_2^3 d\lambda$$

or $$H_{zx} = \sin\chi_2 H_x, H_{xy} = -\cos\chi_2 H_x,$$

$$H_x = \frac{1}{2\pi}\int_0^\infty \lambda^2 J_1(\lambda r_2)\Phi_2^3 d\lambda,$$

where $$\Phi_2^3 = \frac{1}{(p_3 + p_2)\Delta}\left[(e^{-p_2(x_2 - x)} - k_{12}e^{-p_2h}e^{-p_2(x - x_1)})e^{-p_3(x' - x_2)}\right],$$

$$r_2 = \sqrt{(z - z')^2 + (y - y')^2}$$

-continued
$$\cos\chi_1 = \frac{z_0 - z'}{r_1}, \sin\chi_1 = \frac{y_0 - y'}{r_1},$$

$$\cos\chi_2 = \frac{z - z'}{r_2}, \sin\chi_2 = \frac{y - y'}{r_2}.$$

The current loop with center in pint $\xi_0$ and observation point $\xi$ ape located in a layer and the secondary source and current integration point $\xi'$ is located in the lower half-space.

The resultant expression of the integrand takes form $$E_{xz}H_{xy} + E_{xy}H_{yx} = E_\varphi H_x \cos(\chi_2 - \chi_1).$$

Thus, the horizontal magnetic field component is described by the following integral expression $$H_x(\xi_0 | \xi) = \quad (25a)$$

$$H_x^0(\xi_0 | \xi) + \int_V \delta k^2(\xi')E_\varphi(\xi_0 | \xi')H_x(\xi | \xi')\cos(\chi_2 - \chi_1) dV.$$

We next discuss the inversion problem of determining a resistivity distribution corresponding to measured signals. From eqn. 25(a), the e.m.f. difference between initial and background models $\delta e$ can be approximately described in the form of a linear system of algebraic equations $$\vec{\delta e} \approx A\vec{\delta\sigma}, \quad (26)$$

here $\vec{\delta e}$ is a set of increments of measured values, $\vec{\delta\sigma}$ is a set of conductivity perturbations, A is the rectangular matrix of linear coefficients corresponding to integrals over perturbation domains. The matrix A is a Jacobian matrix of partial derivatives of measured values relative to perturbations of the background model. This is determined from the right hand side of eqn. (25a) using known methods. The dimensionality of the matrix is $N_F \times N_P$ ($N_F$ is the number of measurements, $N_P$ is the number of partitions in the perturbation domain).

Solution of the inverse problem is then reduced to a minimization of the objective function (difference between field and synthetic logs)

$$F = \frac{1}{N_F}\sqrt{\sum_{i=1}^{N_F}\left(\frac{e_i^E - e_i^T}{e_i^E}\right)^2}$$

where $e_i^E$ and $e_i^T$ are observed and synthetic values of a difference e.m.f., respectively.

Elements of vectors $\vec{\delta e}$ and $\vec{\delta\sigma}$ of the linear system of algebraic equations are defined as $$\delta e_i = e_i^E - e_i^T, \delta\sigma_j = \sigma^b - \sigma_j,$$

here indices $i = 1, \ldots, N_F$ and $j = 1, \ldots, N_P$ are numbers of measurements and values of electrical conductivity in j-domain, respectively.

Let us linearize the inverse problem in the vicinity of model parameters. The functional minimum F is attained if $$\vec{\delta\sigma} \approx A^{-1}\vec{\delta e},$$

here $A^{-1}$ is a sensitivity matrix, $$a_{ij} = \frac{\partial e_{ij}^b}{\partial \sigma_{ij}^b}$$

are elements of the matrix.

Figure 7:
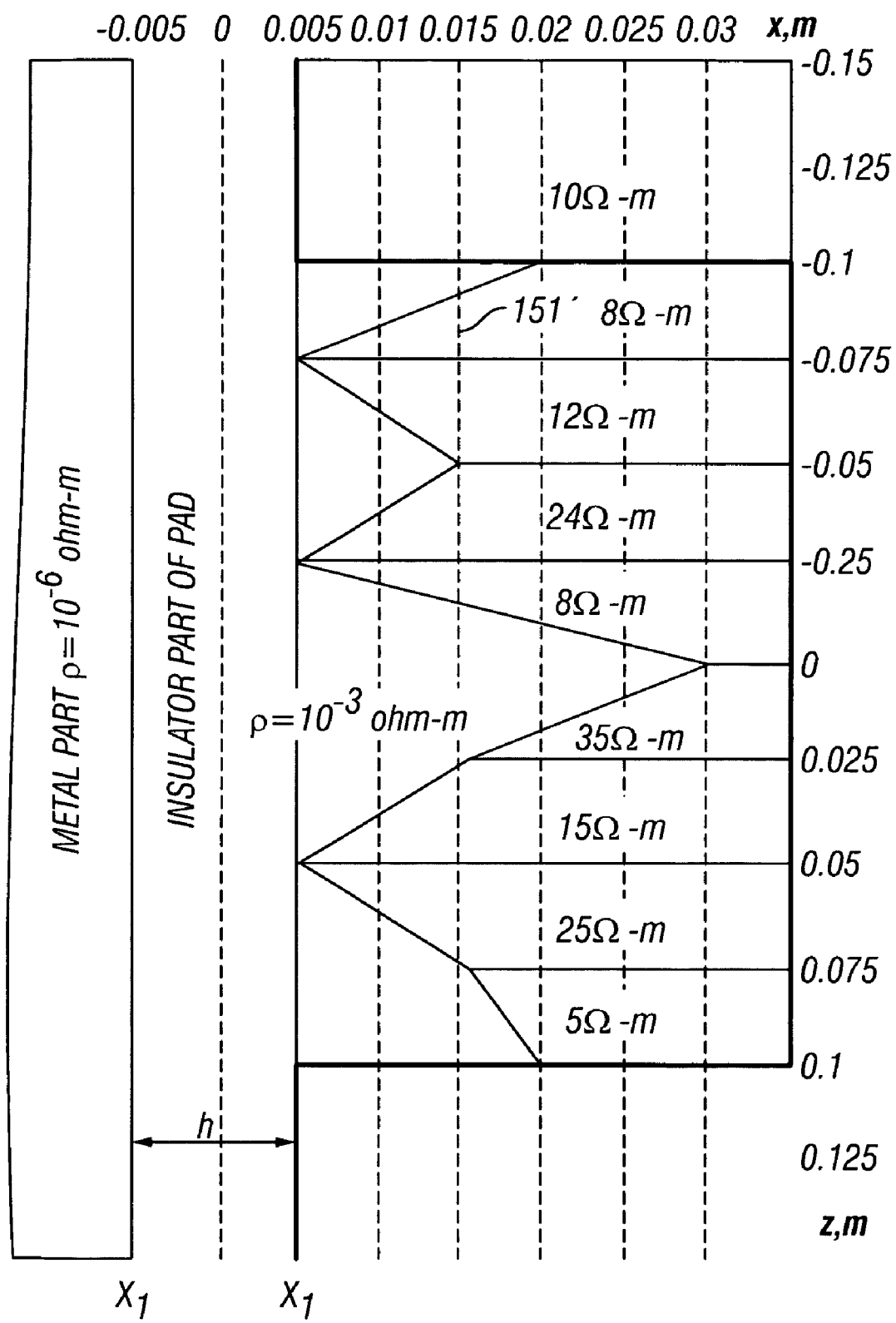
FIG. 7 shows an exemplary model used for evaluating the method of the present invention.

We consider several examples of reconstruction of the electrical resistivity distribution in a medium. Shown in FIG. 7 is a two-dimensional relief of the borehole wall. The relief is assumed to change within the range of length 0.2 m (from −0.1 m to 0.1 m). Its maximum amplitude is 0.025 m. The operating frequency is equal to 20 MHz.

Figure 11:
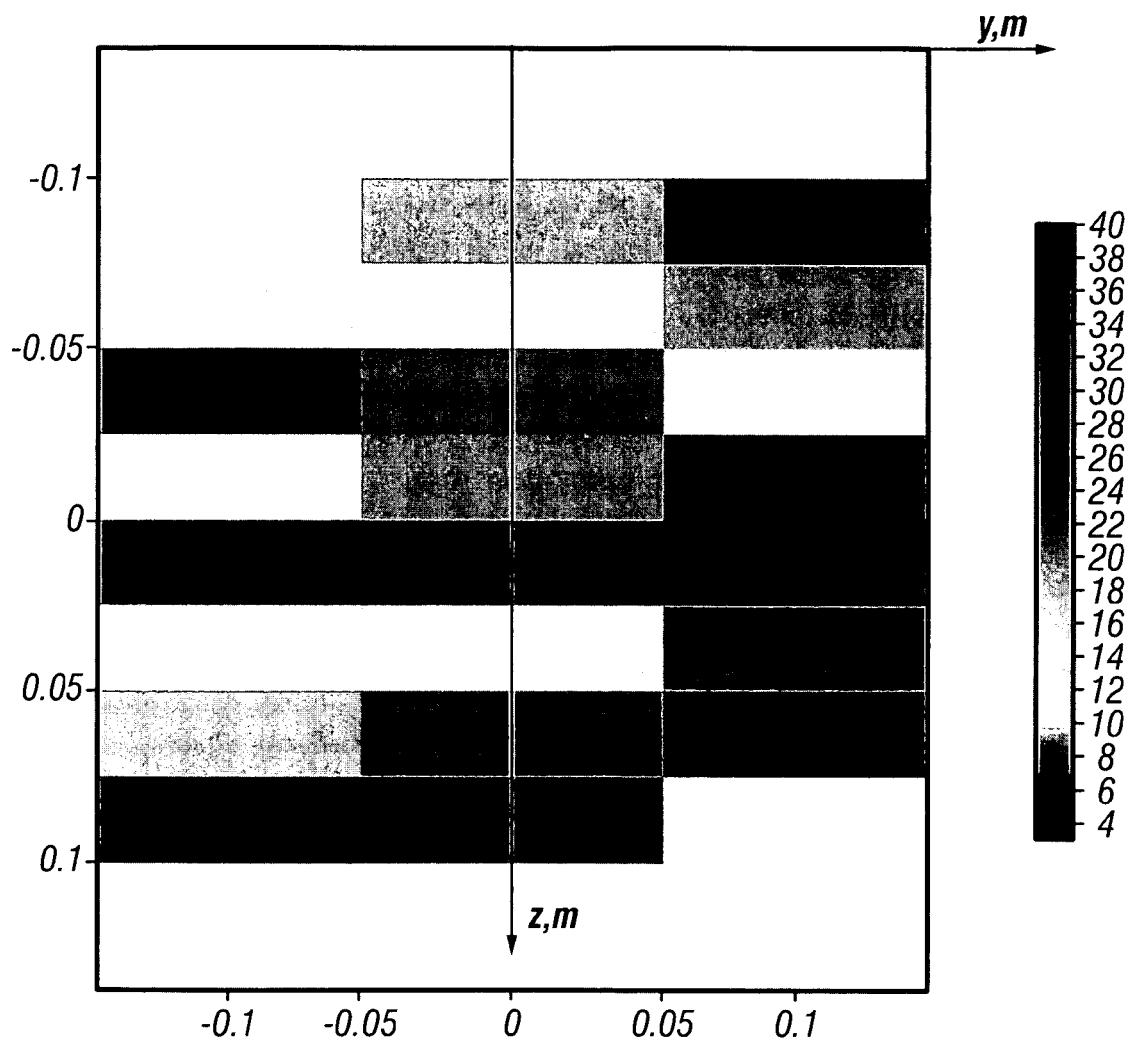
FIG. 11 shows an exemplary 3-D model used for evaluating the method of the present invention.

Two models are considered. The first model is two dimensional (resistivity is invariant along the y axis). The resistivity distribution along the borehole wall is shown in FIG. 7. The resistivities are as indicated and the borehole wall is given by 151'. The second model is three-dimensional. The resistivity distribution in the planes y=±0.025 is shown in FIG. 11. At y=0, the resistivity distribution is the same as for the two-dimensional model (FIG. 7). The background model resistivity is equal to 10 ohm·m. Resistivities of subdomains range from 5 to 35 ohm·m. The width of all subdomains is the same and it is 0.025 or 0.05 m.

When averaged resistivity are determined, the array of the type shown in FIG. 2 is used. Currents in generator loops are given proportionally to the ratio of normal e.m.f.

$$\frac{I_2}{I_1} = -\frac{Ree_1}{Ree_2} = -\frac{0.419}{0.482} = -0.868.$$

A signal measured in such a system is mostly dependent on the average resistivity of a medium being investigated.

Figure 8:
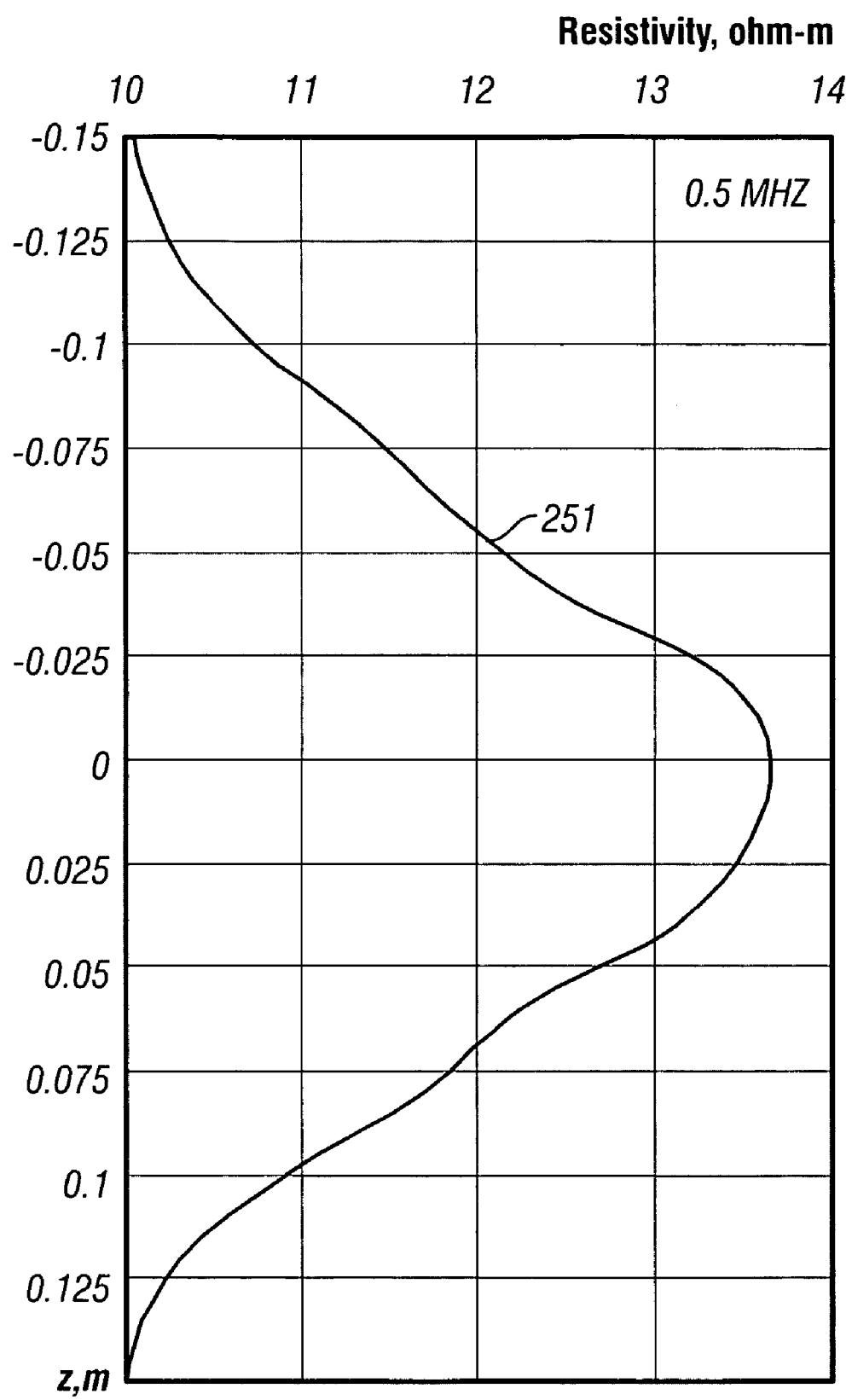
FIG. 8 shows a background model corresponding to the model of FIG. 7.
Figure 9A:
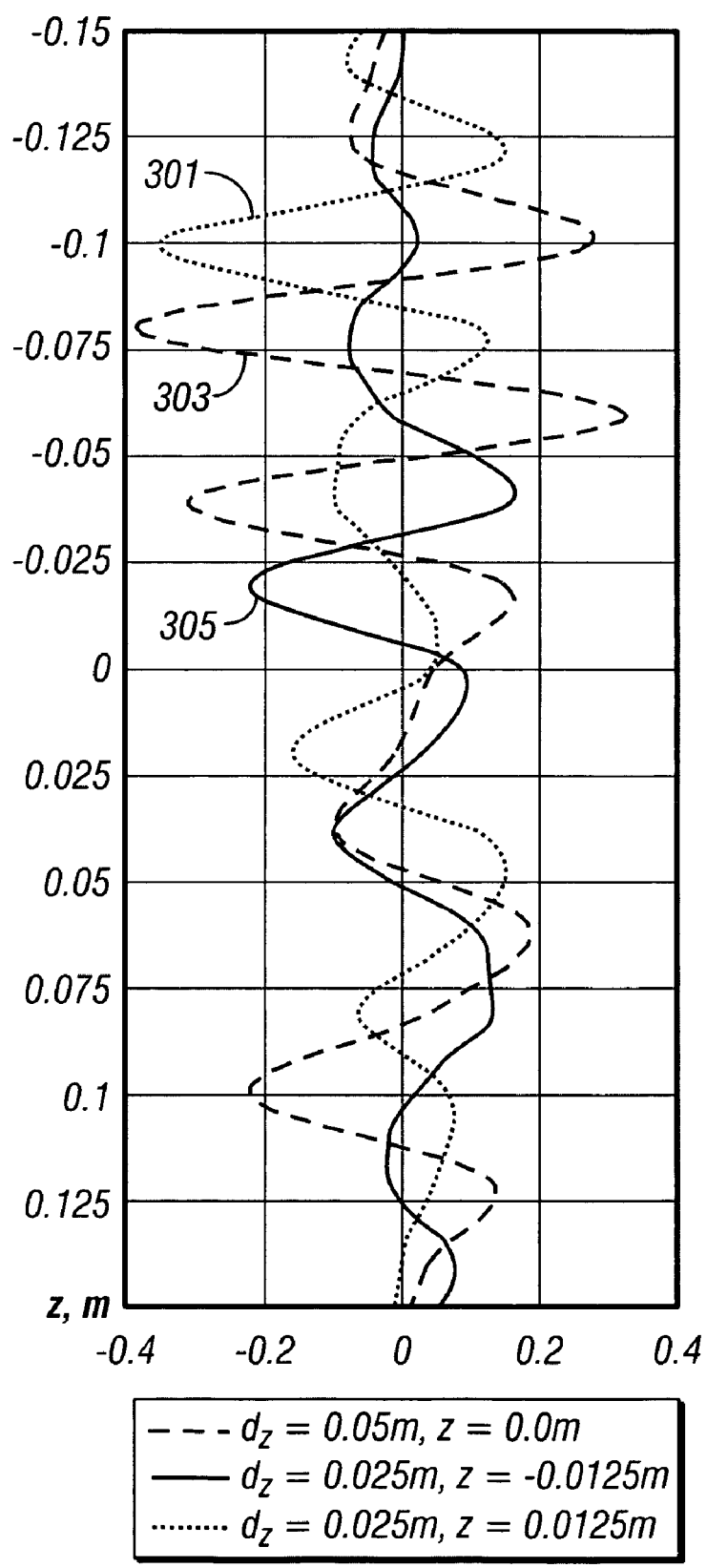
FIGS. 9a and 9b show responses of the antennas of FIG. 6 to the model of FIG. 7

In FIG. 8, there is shown the resistivity distribution 251 in a background medium obtained through measurements by an array of the type shown in FIG. 2. In FIG. 9a, there are shown synthetic logs 301, 303, 305 for three arrays $d_z=2r_0=0.05$ m and $d_z=\pm r_0=\pm 0.025$ m. The array centers are located along the z axes See FIG. 6. The arrays can move along the z axis. The normal signal (in "a metal-insulator" medium) for a separate ring $e_0 \approx 6$ V. At the compensation coefficient $10^{-3}$, effect of metallic pad part will be less than 6 mV. In this case, a useful signal attains the value of 400 mV.

Figure 9B:
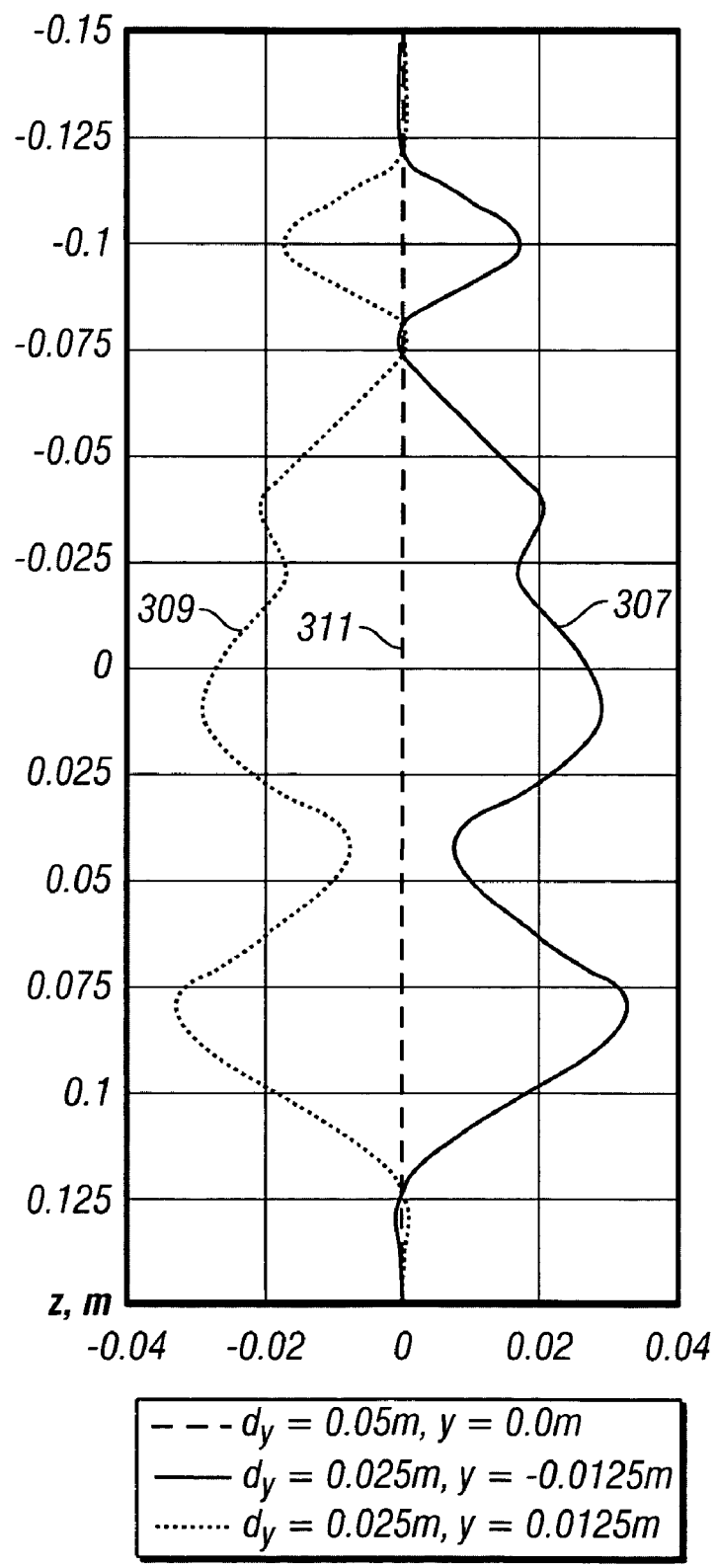

In FIG. 9b are shown synthetic logs 307, 309, 311 for the same arrays, but the array centers are located along the y axis. The arrays can move along the z axis. In this case, a useful signal is about 2-3 times less that than in previous case and it does not exceed 150 mV.

Figure 10:
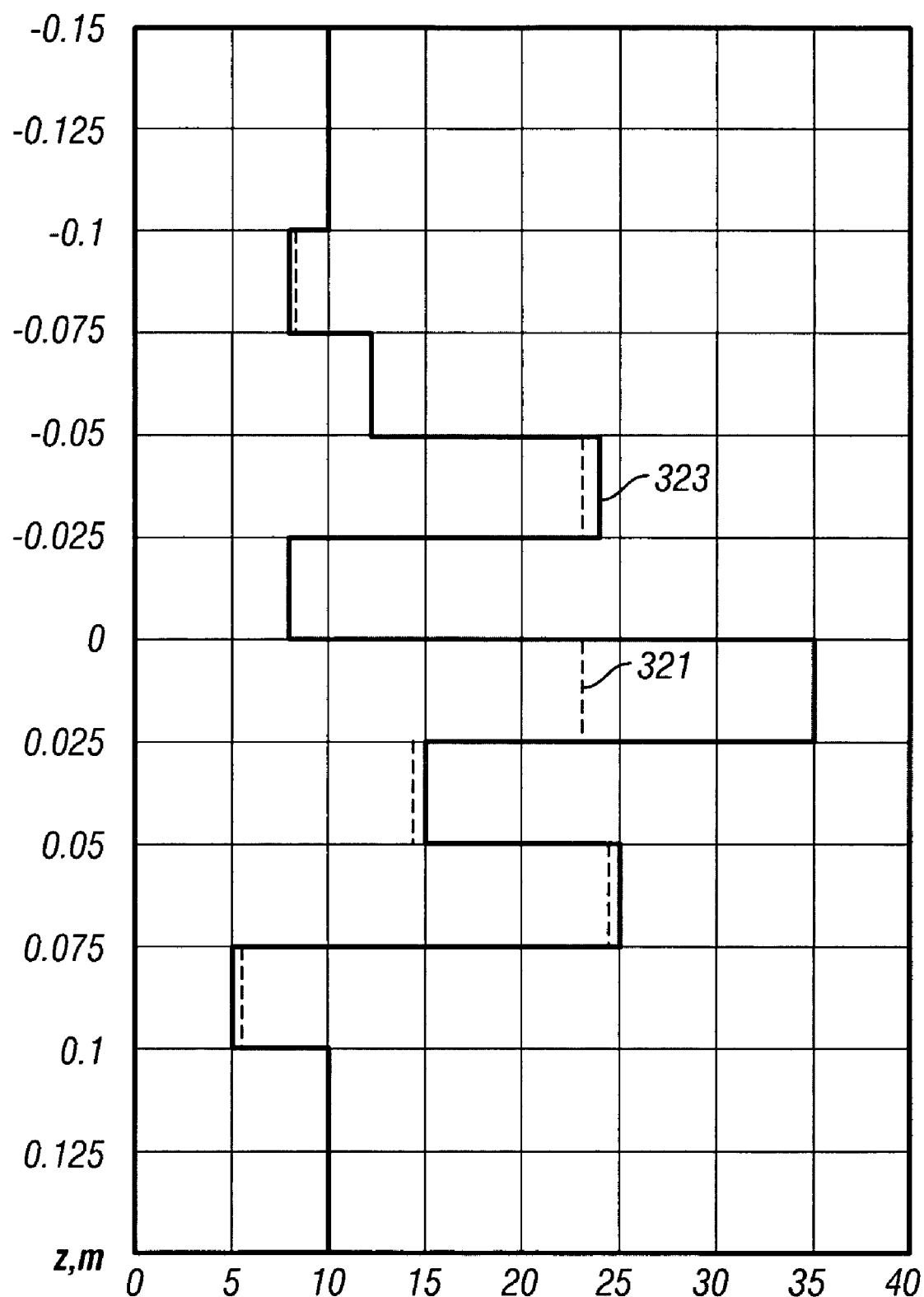
FIG. 10 shows results after one and four iterations of using the method of the present invention on the responses shown in FIGS. 9a and 9b.

FIG. 10 shows the results of the inversion of the logs of FIGS. 9a, 9b after one iteration 321 and after four iterations 323. At four iterations, the results had converged to very close to the true resistivity (compare with the resistivity valuews in FIG. 7). The iterative procedure is discussed below.

Figure 12:
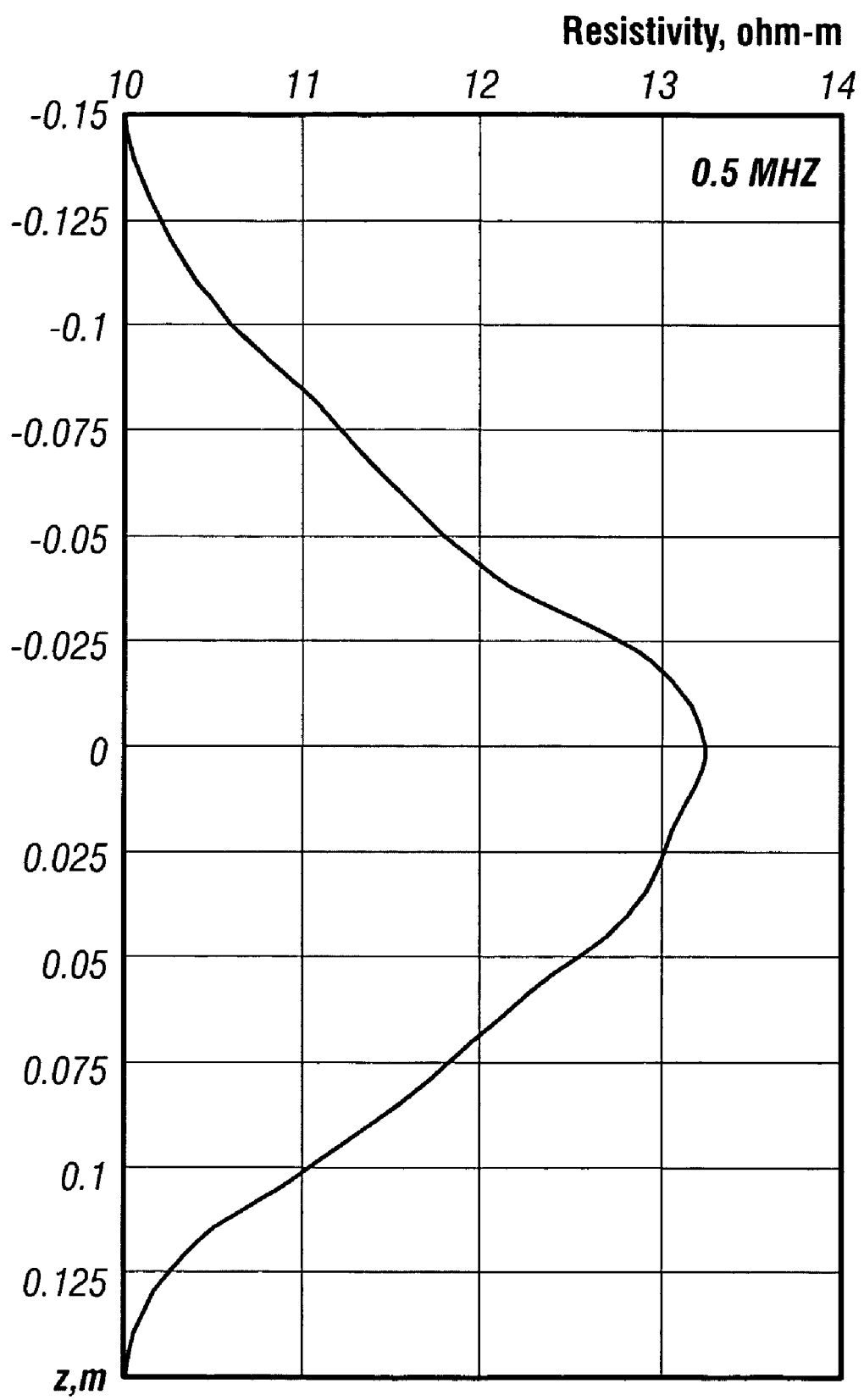
FIG. 12 shows a background model corresponding to the model of FIG. 11.

Next, a three-dimensional model based on the two-dimensional model is considrered. In the 3-D model, at y=0, both 2D and 3D distributions are the same. The 3D resistivity distribution is shown in FIG. 11. Shown in FIG. 12 are the average 1D resistivity distribution obtained trough measurements by the differential array of the first type shown in FIG. 2. In FIG. 13a are shown synthetic logs for three arrays—the central array (203 and 207) ($d_z=2r_0=0.05$ m) and two symmetrical arrays (203 and 209; 207 and 209) ($d_z=\pm r_0=\pm 0.025$ m). A measured signal ranges from −350 to 250 mV. At this we can see on the log the large number of extrema that arise at points where the system crosses layer boundaries. In FIG. 13b are shown logs for arrays with loop centers are located along the y axis as the array moves along the z axis. In this case a signal becomes essentially less than that in FIG. 13a and it ranges from −50 to 40 mV. The number of extrema decreases also (especially for the log obtained by the central array). Solution of the inverse problem results in reconstruction of the 3D distribution nearly without distortions. This is shown in FIGS. 14a and 14b.

Shown in FIG. 14a are inversion results for y≦0.05 m after one iteration 401 and after four iterarations 403. FIG. 14b shows the inversion results for y≧0.05 m after one iteration 405 and after four iterations 405. The results are in good agreement with the model in FIG. 11.

Figure 15:
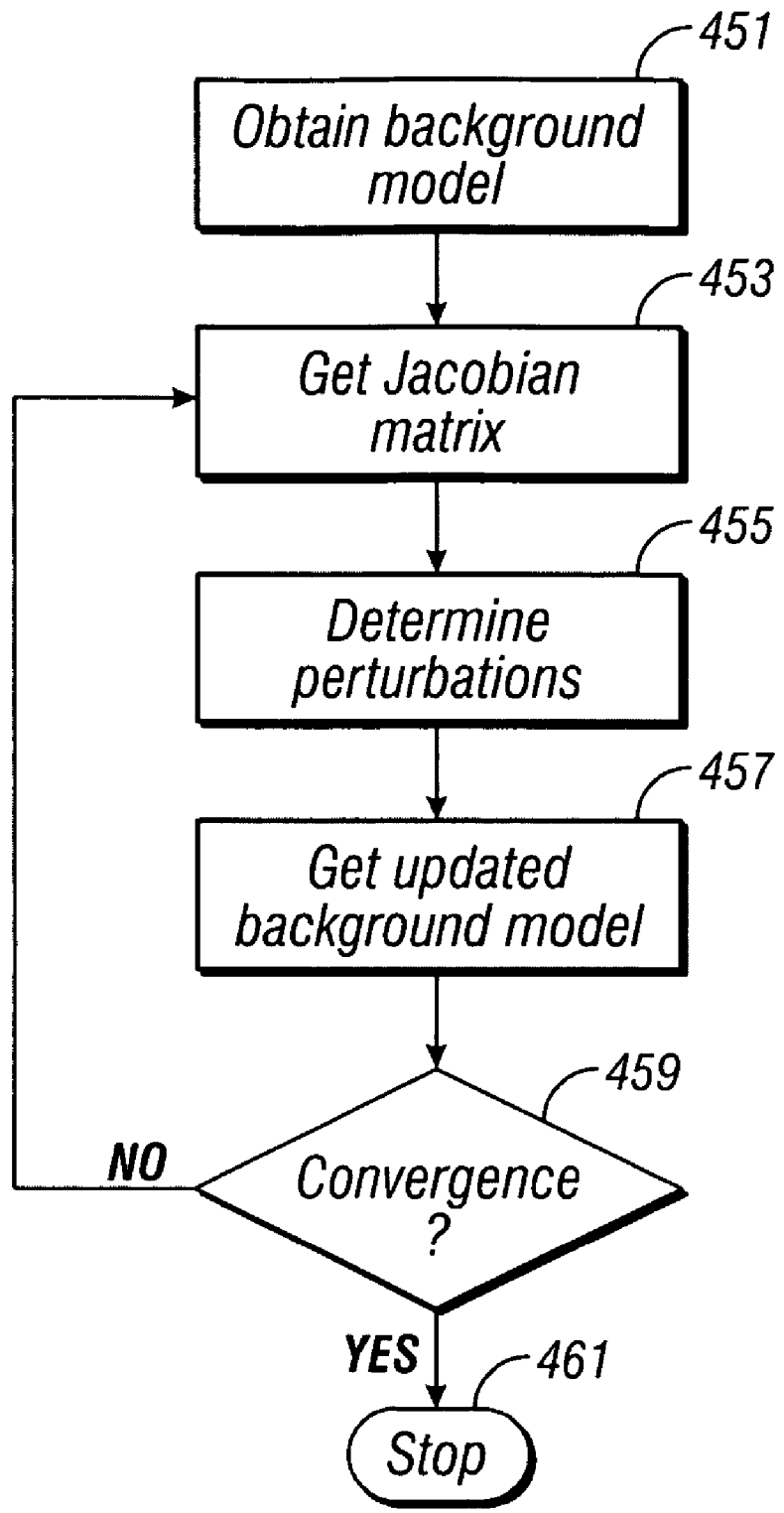
FIG. 15 is a flow chart illustrating the method of one embodiment of the invention.

A brief explanation of the iterative procedure follows. Referring to FIG. 15, as noted above, an initial model 451 is the starting point for the inversion. Using the Jacobian matrix A discussed above 453, perturbations to the conductivity model are obtained 455 using eq. (26). Specifically, the difference between the measurements and the model output are inverted using the Jacobian matrix. This perturbation is added 457 to the initial model and, after optional smoothing, a new model is obtained. A check for convergence between the output of the new model and the measurements is made 459 and if a convergence condition is met, the inversion stops 461. If the convergence condition is not satisfied, the linearization is then repeated 453 with the new Jacobian matrix. The convergence condition may be a specified number of iterations or may be the norm of the perturbation becoming less than a threshold value.

An important aspect of the inversion procedure is the definition of the initial model. The initial model comprises two parts: a spatial configuration of the borehole wall and a background conductivity model that includes the borehole and the earth formation. In one embodiment of the invention, caliper measurements are made with an acoustic or a mechanical caliper. An acoustic caliper is discussed in U.S. Pat. No. 5,737,277 to Priest having the same assignee as the present invention and the contents of which are fully incorporated herein by reference. Mechanical calipers are well known in the art. U.S. Pat. No. 6,560,889 to Lechen having the same assignee as the present application teaches and claims the use of magnetoresistive sensors to determine the position of caliper arms.

The caliper measurements defines the spatial geometry of the model. The spatial geometry of the model is not updated during the inversion The borehole mud resistivity is used as an input parameter in the model. The mud resistivity can be determined by taking a mud sample at the surface. Alternatively, the resistivity of the mud may be made using a suitable device downhole. U.S. Pat. No. 6,801,039 to Fabris et al. having the same assignee as the present invention and the contents of which are incorporated herein by reference teaches the use of defocused measurements for the determination of mud resistivity. If surface measurements of mud resistivity are made, then Corrections for downhole factors such as temperature can be made to the measured mud resistivity by using formulas known in the art.

With the geometry of the borehole wall a fixed quantity, the integrals in eqn. 25(a) needed to determine the Jacobian matrix of eqn. (26) can be determined. In the three-layer model of FIG. 5, the only resistivities that are changed are those in the formation—the borehole fluid having known properties. As noted above, using a plurality of current loops of the type shown in FIG. 6, logs can be obtained at different positions on the measurement pad. The combined set of measurements from the plurality of loops may be inverted data corresponding to a 3-D resistivity model such as that shown in FIG. 11. As noted above, either 2-D or data may be inverted.

The invention has been described above with reference to a device that is conveyed on a drilling tubular into the borehole, and measurements are made during drilling The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole. Due to the inductive nature of the method and apparatus, the invention can be used with both oil based muds (OBM) and with water based muds (WBM). The invention may also be practiced as a wireline implementation using measurements made by a suitable logging tool.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

The scope of the invention may be better understood with reference to the following definitions:;

caliper: A device for measuring the internal diameter of a casing, tubing or open borehole coil: one or more turns, possibly circular or cylindrical, of a current-carrying conductor capable of producing a magnetic field;

EAROM: electrically alterable ROM;

EEPROM: EEPROM is a special type of PROM that can be erased by exposing it to an electrical charge.

EPROM: erasable programmable ROM;

flash memory: a nonvolatile memory that is rewritable;

induction: the induction of an electromotive force in a circuit by varying the magnetic flux linked with the circuit.

Initial model: an initial mathematical characterization of properties of a region of the earth formation consisting of two two parts: a spatial configuration of the borehole wall and a smooth background conductivity model that includes the borehole and the earth formation.;

Inversion: Deriving from field data a model to describe the subsurface that is consistent with the data machine readable medium: something on which information may be stored in a form that can be understood by a computer or a processor;

Optical disk: a disc shaped medium in which optical methods are used for storing and retrieving information;

Resistivity: electrical resistance of a conductor of unit cross-sectional area and unit length; determination of resistivity is equivalent to determination of its reciprocal, conductivity;

ROM: Read-only memory.

Slickline A thin nonelectric cable used for selective placement and retrieval of wellbore hardware vertical resistivity: resistivity in a direction parallel to an axis of anisotropy, usually in a direction normal to a bedding plane of an earth formation;

wireline: a multistrand cable used in making measurements in a borehole;

What is claimed is:

1. A method of determining a conductivity of an earth formation, the method comprising:
   (a) making first measurements of the conductivity using at least one transmitter coil (loop) and at least one receiver coil disposed on a tool in a borehole in the earth formation, the at least one transmitter and the at least one receiver coil having an axis substantially orthogonal to an axis of the borehole;
   (b) obtaining second measurements indicative of distances from the tool to a wall of the borehole;
   (c) inverting the first measurements using an initial model defined at least in part by the second measurements to estimate the conductivity; and
   (d) recording the estimated conductivity on a suitable medium.

2. The method of claim 1 wherein the obtaining the second measurements further comprises using at least one of: (i) an acoustic caliper, and (ii) a mechanical caliper.

3. The method of claim 1 wherein the initial model comprises the distance from the tool to the wall of the borehole at a plurality of spatial positions.

4. The method of claim 1 wherein defining the initial model further comprises (i) obtaining a background resistivity of the formation, and (ii) obtaining a resistivity of a fluid in the borehole.

5. The method of claim 1 wherein inverting the first measurements further comprises:
   (i) determining a difference between the first measurements and an output of the initial model; and
   (ii) obtaining an updated model by adding a perturbation determined from the difference to the initial model.

6. The method of claim 5 wherein determining the perturbation further comprises using a Jacobian matrix determined from the initial model.

7. The method of claim 5 wherein the updated model is one of (i) a 1-D model, (ii) a 2-D model, and (iii) a 3-D model.

8. The method of claim 1 further comprising conveying the logging tool into the borehole using a conveyance device selected from (i) a wireline, (ii) a drilling tubular, and (iii) a slickline.

9. An apparatus for determining a conductivity of an earth formation, the apparatus comprising:
   (a) at least one transmitter coil (loop) and at least one receiver coil disposed on a tool in a borehole in the earth formation, the at least one receiver configured to produce first measurements indicative of the conductivity in response to activation of the at least one transmitter coil, the at least one transmitter coil and the at least one receiver coil having axes substantially orthogonal to an axis of the borehole;
   (b) a caliper configured to produce second measurements indicative of a distance from the tool to a wall of the borehole; and
   (c) a processor configured to:
      (A) define an initial model based at least in part on the second measurements, (B) invert the first measurements using the initial model to provide an estimate of the conductivity; and
(C) record the estimate on a suitable medium.

10. The apparatus of claim 9 wherein the caliper comprises at least one of:
(i) an acoustic caliper, and (ii) a mechanical caliper.

11. The apparatus of claim 9 wherein processor defines is configured to define the initial model using the distance from the tool to the wall of the borehole at a plurality of spatial positions.

12. The apparatus of claim 9 wherein the initial model further comprises (i) a background resistivity of the formation, and (ii) a resistivity of a fluid in the borehole.

13. The apparatus of claim 12 further comprising:
(I) a first resistivity measuring device configured to produce an output indicative of the background resisitivity and substantially insensitive to a change in the wall of the borehole, and
(II) a second unfocused resistivity measuring device configured to produce an output indicative of the resistivity of the fluid.

14. The apparatus of claim 9 wherein the processor is configured to invert the first measurements by further:
(i) determining a difference between the first measurements and an output of the initial model; and
(ii) obtaining an updated model by adding a perturbation determined from the difference to the initial model.

15. The apparatus of claim 14 wherein the processor is configured to determine the perturbation by further using a Jacobian matrix determined from the initial model.

16. The apparatus of claim 15 wherein the updated model is one of (i) a 1-D model, (ii) a 2-D model, and (iii) a 3-D model.

17. The apparatus of claim 9 further comprising a conveyance device configured to convey the logging tool into the borehole, the conveyance device selected from (i) a wireline, (ii) a drilling tubular, and (iii) a slickline.

18. The apparatus of claim 9 wherein the processor is at a location selected from (i) a downhole location, (ii) a surface location, and (iii) a remote location.

19. A machine readable medium for use with an apparatus for determining a conductivity of an earth formation, the apparatus comprising:
(a) at least one transmitter coil (loop) and at least one receiver coil disposed on a tool in a borehole in the earth formation, the at least one receiver configured to produce first measurements indicative of the conductivity in response to activation of the at least one transmitter coil, the at least one transmitter coil and the at least one receiver coil having axes substantially orthogonal to an axis of the borehole, and;
(b) a caliper configured to produce second measurements indicative of a distance from the tool to a wall of the borehole;

the medium comprising instructions which enable a processor to
(c) define an initial model based at least in part on the second measurements, and
(d) invert the first measurements using the initial model to estimate the conductivity; and
(e) record for the estimated conductivity on a suitable medium.

20. The medium of claim 19 further comprising at least one of (i) a ROM, (ii) an EAROM, (iii) an EPROM, (iv) an EEPROM, (v) a flash memory, and (vi) an optical disk.

* * * * *